June 24, 1930.  E. L. BELL  1,768,101
RAKE CONSTRUCTION
Filed Nov. 29, 1927
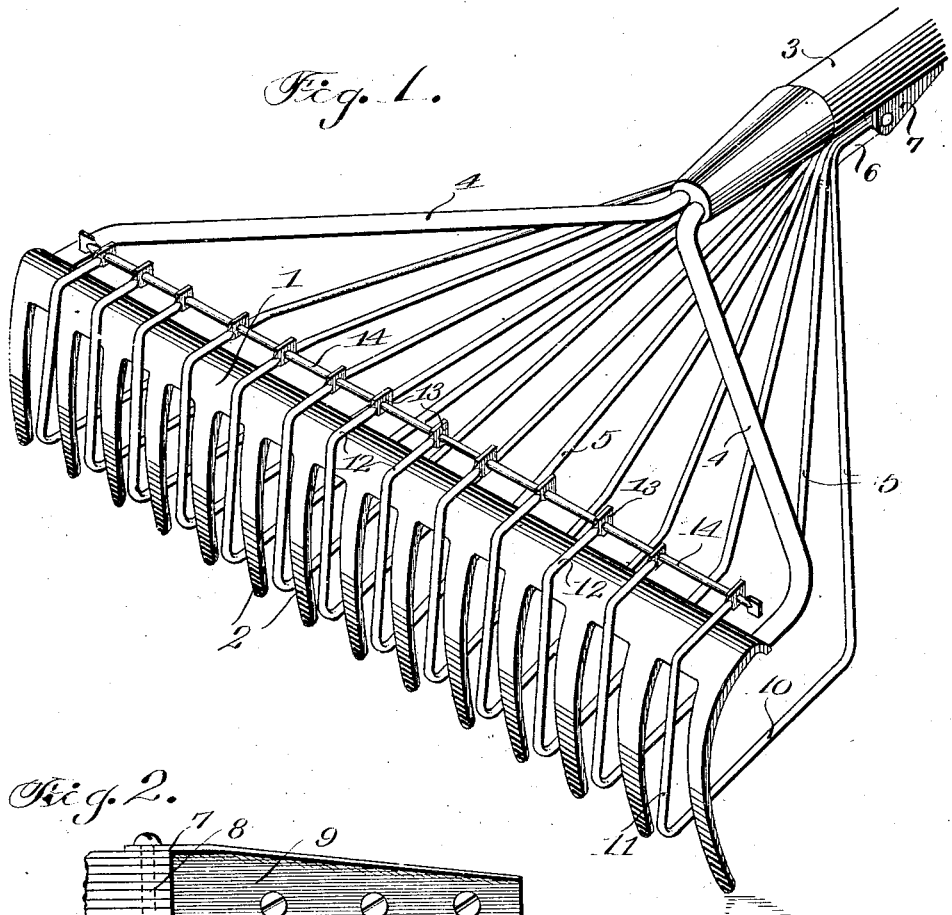
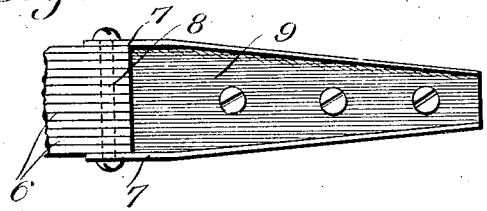
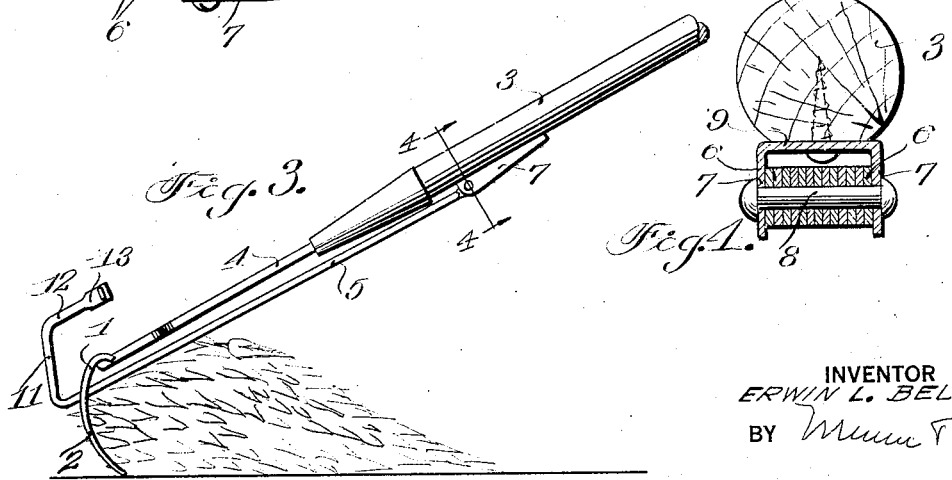
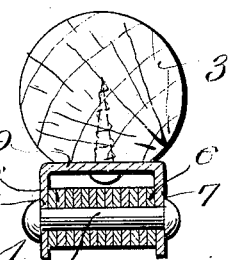
INVENTOR
ERWIN L. BELL
BY
ATTORNEY Patented June 24, 1930

1,768,101

UNITED STATES PATENT OFFICE

ERWIN L. BELL, OF LEBANON, TENNESSEE

RAKE CONSTRUCTION

Application filed November 29, 1927. Serial No. 236,514.

This invention relates to rakes and similar toothed implements, and is more particularly concerned with and has for its object the provision of a construction which not only facilitates the collection of matter by the rake, but functions effectively to clear its teeth or tines of matter adhering to or impaled thereon.

Rake clearers or cleaners as heretofore proposed and constructed have functioned to clear the teeth or tines of matter wedged between or impaled on the tines and have not participated or aided in the raking operation.

The construction of the present invention not only has this dual function, but combines this with simplicity of structure and arrangement providing economy both in material and labor in its manufacture and application. Furthermore, the construction provides the advantage of compactness, since the size of the rake head is not appreciably increased thereby.

These and other features and advantages of the invention will be apparent from the following detailed specification when read in connection with the accompanying drawings forming part thereof and in which:

Figure 1 is a perspective view of the head of a hand rake having the device of the present invention attached thereto, and positioned in its normal or initial relation to the rake teeth and ground.

Figure 2 is a fragmentary plan view of the pivotal mount for the ends of the follower and teeth clearing bars by means of which they are attached to the under side of the rake handle or other rake carrying bar.

Figure 3 is a view in elevation showing the mass compacting and holding action of the follower and clearing bars.

Figure 4 is a transverse section on an enlarged scale taken on the line 4—4 of Figure 3.

The construction of the present invention may be regarded as a rake per se, and since it may be applied to all standard forms of toothed rakes, may also be considered as an attachment.

Referring to the drawings, the rake head 1 is of conventional form providing a series of depending curved teeth or tines 2, the head being joined to the supporting handle 3 by means of yoke arms 4 which may be integral with or rigidly secured to the opposite ends of the head in any suitable manner. The ends of the yoke are inserted in sockets in the end of the supporting handle 3 in the usual manner. Cooperating with the teeth 2 of the rake head are a plurality of clearing bars 5 which have the additional function of followers engaging and compacting material collected by the rake teeth tending to retain the material in mass formation. These clearing or follower bars 5 are conveniently formed of rod stock. One end of each of the bars is flattened as at 6, the flattened ends of the bars being assembled and pivotally mounted between the side walls 7 of a bracket plate or mount by means of a common pivot stud 8. The base 9 of this bracket plate which, as shown, is flat, but which obviously may be, if desired, curved to conform to the contour of the supporting handle 3, is secured to the under side of the handle 3 by means of screws or other fasteners inserted through its base plate into the handle. Obviously, the bar 3 when of rounded contour, is flattened to provide a bearing for the plate. The bars 5 from their flattened pivoted ends incline downwardly and provide portions 10 which extend substantially parallel with the supporting handle and with the ground when the rake is in use. These portions, or what I term, follower portions of the bars extend to the toothed rake head and between successive teeth thereof with their ends bent upwardly as at 11 and thence backwardly as at 12 over the top of the rake head. The end extremities 13 of the bars at this point are flattened and provide alined apertures through which a transverse bar 14 extends to join the series of bars 5 together as a unit. This bar 14 may be of rod stock and is permanently held on the series of bars by any suitable means, such for example, as by flattening the ends as shown. The rearwardly extending end portions 12 of these bars act as abutments limiting the downward movement of these follower portions so that they are positioned in a plane above the plane of the lower ends of the rake teeth 2 and in a plane which is approximately parallel with the ground and with the support bar or handle 3 as shown.

These series of bars 5 as thus constructed and joined by the transverse bar 14 constitute a clearing rack by means of which matter wedged between or impaled upon the rake teeth may be forced or cleared therefrom, and has the additional function of a follower rack since the said portions 10 will rest by gravity upon matter collected by the rake teeth and tend to compact and hold it in mass formation. Obviously, the series of bars 5 are mounted as to normally drop by gravity to the position suggested in Figure 1, in which their follower portions 10 are positioned by the upper ends 12 of the bars above the ground and above the plane of the ends of the rake teeth. Consequently as the mass of matter collected by the rake teeth increases in bulk and rises, the follower bar portions 10 are forced upwardly with the increase in mass, pressing down upon the mass and tending to compact it and maintain it in mass formation. Any matter wedged between the teeth or impaled thereon when the collected matter reaches its maximum size will be either stripped or cleared from the teeth by the weight of the rake bars, or may be forcibly cleared therefrom by pressure of the upper joined end of these bars applied by reversing the rake and pressing the upper end of the clearing bars against the ground or other abutment.

This clearing rack with its mount or supporting bracket may be made to fit standard sizes and forms of rake heads and sold as an attachment for said rake heads, or may be mounted upon and combined with the rake head in its initial manufacture. Since the bars tend by gravity normally to swing downwardly to the position shown in Figure 1 of the drawings, the size of the rake head is not appreciably increased and a compact structure is provided which may be easily stored without requiring unusual space such as will be required if the rake were normally projected above the top of the rake head.

While the form of the invention disclosed is a preferable one, it is intended as illustrative and not restrictive of the invention. Consequently it will be understood that the structure may be varied and adapted to different operating conditions and rake structures in consonance with the spirit of the invention and the scope of the appended claims.

What I claim, therefore, and desire to secure by Letters Patent is:

1. In a rake having a supporting handle and a toothed head, a plurality of follower bars pivotally mounted at their rear ends on the supporting handle and extending forwardly therefrom and normally moved downwardly by gravity to overlie, engage and compact matter collected by said teeth, said bars arising in response to upward pressure due to increase in mass of the matter collected by said teeth with means for limiting downward movement of said follower bars relatively to the head.

2. In a rake having a supporting handle and a toothed head, a plurality of follower and clearing bars pivotally mounted at their rear ends on the supporting handle and extending forwardly therefrom between the teeth of said head and normally moved downwardly, by gravity, to overlie, rest on and compact matter as collected by the teeth of said head, said bars having means engaging said toothed head and limiting their downward gravity effected movement, and rising in response to the upward pressure of increase in matter collected by said teeth.

3. In a rake having a supporting handle and a toothed head, a plurality of follower and clearing bars pivotally mounted at their rear ends on said handle and extending forwardly therefrom to between the teeth of said head and normally moved downwardly by gravity to overlie, rest upon and compact matter as collected by the teeth of said head and rising in response to upward pressure of increase in mass of said collected matter, said bars having extensions upstanding from their forward ends to overlie and engage the toothed head and limit the downward gravity effected movement of said bars to a point above the lower ends of the teeth of said rake head.

4. As an article of manufacture, an attachment for toothed rake heads having supporting handles comprising a series of follower bars having their rear ends pivotally mounted for free swinging movement in a bracket member attachable to the under side of the rake handle and having forwardly extended portions spread outwardly fanwise to extend between adjacent teeth of the rake head and provided at their forward ends with upwardly and laterally turned extensions overlying the top of the rake head to abut the same and limit down swinging movement of the follower bars.

5. As an article of manufacture, an attachment for toothed rake heads having supporting handles comprising a series of follower bars having their rear ends pivotally mounted for free swinging movement in a bracket member attachable to the under side of the rake handle and having forwardly extended portions spread outwardly fan-wise to extend between adjacent teeth of the rake head and provided at their forward ends with upwardly and laterally turned extensions overlying the top of the rake head to abut the same and limit down swinging movement of the follower bars, and a brace bar across connecting and joining the laterally turned ends of said bar extensions for movement of said bars in unison.

Signed at Lebanon, in the County of Wilson and State of Tennessee, this 26th day of November, A. D. nineteen hundred twenty-seven.

ERWIN L. BELL.